Figure 2:
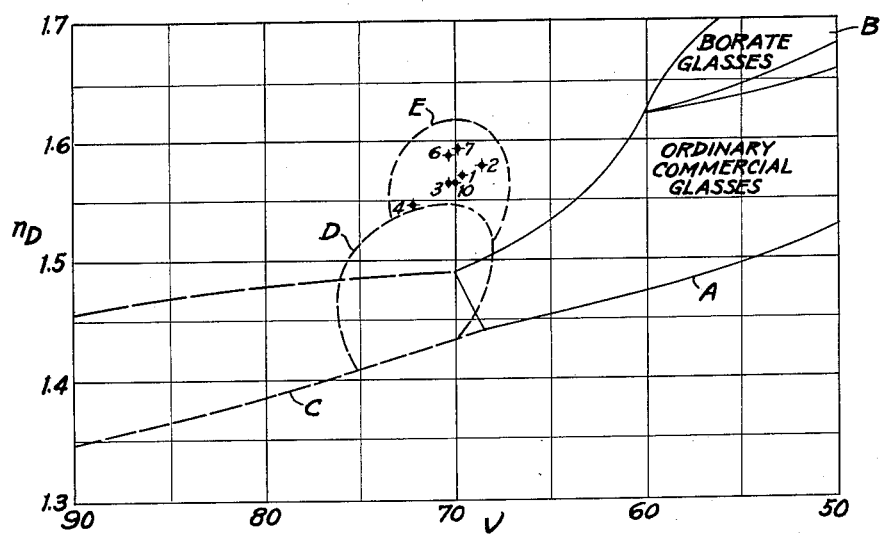

KUAN-HAN SUN
INVENTOR

BY Newton M. Perrine
ATTORNEY

Patented June 13, 1950

2,511,225

UNITED STATES PATENT OFFICE 2,511,225

FLUOPHOSPHATE GLASS

Kuan-Han Sun, Rochester, N. Y., assignor to Eastman Kodak Company, Rochester, N. Y., a corporation of New Jersey Application January 29, 1946, Serial No. 644,179

6 Claims. (Cl. 106—47)

The present invention relates to novel glasses and to batches from which they are made and particularly to fluophosphate glasses having novel compositions and unique and desirable optical properties.

These new glasses may be briefly described as essentially and primarily of aluminum phosphate, but containing also barium and other fluorides in such quantity that the atomic ratio F/P lies between 0.4 and 6.5, the glass being substantially free, however, from alkali metal fluoride. While the alkali metal fluorides have low melting points and a glass containing them in quantity melts at a low temperature, is very fluid, and softer and less chemically durable than those not containing them, I have found that fluophosphate glasses having a very high proportion of fluorine and having desirable properties can be made without alkali metal within the limits that are hereinafter pointed out.

The optical properties of these glasses are close to those containing alkali metal in substantial proportions, but in general they have higher refractive indices and lower Abbé values, and their F/P ratio is in some cases much higher than is obtainable with the alkali-containing glasses. Because of this and of the absence of alkali metal, they are almost unattacked by concentrated hydrofluoric acid.

These glasses have low melting temperatures, about 1050° C. or lower. While this is somewhat higher than the alkali metal-containing glasses, it is lower than that of the customarily used oxide glasses, and is lower by at least 300° C. than the melting points of any of the ingredients. These low melting temperatures eliminate considerably volatilization losses.

The general system of the glasses herein disclosed may be represented by the formula: $BaF_2$—$MF_m$—$Al_2O_3$—$P_2O_5$ in which $MF_m$ represents one or more of $MgF_2$, $CaF_2$, $SrF_2$, $ZnF_2$, $LaF_3$, $CdF_2$, $PbF_2$, and $ThF_4$. The latter may be omitted entirely, the glass in this case being made from a batch consisting of barium fluoride and aluminum metaphosphate as those in System A, Table I. For practical convenience, $Al(PO_3)_3$ is used instead of mixtures of various proportions of $Al_2O_3$ and $P_2O_5$.

While the examples herein given contain no alkali metal fluoride, and this is preferred, I consider as within the scope of my invention the addition of a small percentage, less than seven per cent by weight, of alkali metal fluoride in quantities which, while they would affect the desirable properties, would still yield a useful glass. This may amount to what seems a high molecular percentage, even as high as thirty or forty per cent, but this is not preferred; and in every case the amount of alkali metal fluoride is less than the barium fluoride. In other words, my claims are not to be avoided by adding ingredients which do not destroy the useful characteristics of the glass. It is further to be noted that in all of the examples given molecular percentage of barium fluoride is greater than of any other components and that the sum of the percentages of barium fluoride and aluminum metaphosphate is at least fifty by weight and fifty-five by molecular proportions.

Table I gives the composition limits, both in weight and mole percentages, of the simple binary and ternary systems mentioned above, as determined experimentally. The table also shows the highest F/P ratio utilized in each system. It is to be noted that although these simple systems are presented, the addition of small amounts of various compatible ingredients is good practice to prevent devitrification or phase separation and to increase the chemical durability of the glass.

TABLE I

| | Systems | Components | Weight, Per cent | Mole, Per cent | Highest F/P |
|---|---|---|---|---|---|
| A | $BaF_2$-$Al(PO_3)_3$ | $BaF_2$ | 55-62 | 65-71 | 1.6 |
| | | $Al(PO_3)_3$ | 38-45 | 29-35 | |
| B | $BaF_2$-$MgF_2$-$Al(PO_3)_3$ | $BaF_2$ | 31-62 | 23-71 | 3.4 |
| | | $MgF_2$ | 0-29 | 0-58 | |
| | | $Al(PO_3)_3$ | 31-45 | 16-35 | |
| C | $BaF_2$-$CaF_2$-$Al(PO_3)_3$ | $BaF_2$ | 30-65 | 25-71 | 3.0 |
| | | $CaF_2$ | 0-30 | 0-54 | |
| | | $Al(PO_3)_3$ | 30-47 | 19-35 | |
| D | $BaF_2$-$SrF_2$-$Al(PO_3)_3$ | $BaF_2$ | 26-62 | 26-71 | 2.4 |
| | | $SrF_2$ | 0-34 | 0-46 | |
| | | $Al(PO_3)_3$ | 32-45 | 21-35 | |
| E | $BaF_2$-$ZnF_2$-$Al(PO_3)_3$ | $BaF_2$ | 39-62 | 35-71 | 3.0 |
| | | $ZnF_2$ | 0-29 | 0-46 | |
| | | $Al(PO_3)_3$ | 30-45 | 18-35 | |
| F | $BaF_2$-$LaF_3$-$Al(PO_3)_3$ | $BaF_2$ | 54-62 | 62-71 | 2.2 |
| | | $LaF_3$ | 0-9 | 0-9 | |
| | | $Al(PO_3)_3$ | 32-45 | 24-35 | |
| G | $BaF_2$-$ThF_4$-$Al(PO_3)_3$ | $BaF_2$ | 29-62 | 41-71 | 6.1 |
| | | $ThF_4$ | 0-55 | 0-43 | |
| | | $Al(PO_3)_3$ | 14-45 | 14-35 | |

Specific examples and modifications of some of the systems will now be given. So far as now known, the optical properties are also given, $n_D$ representing the index of refraction for the D line; $\nu$, the Abbé value; and $\nu_{gF}$, the partial dispersion ratio for the g and F lines and being defined as:

$$\frac{n_g - n_F}{n_F - n_C}$$

SYSTEM A—EXAMPLE 1

| | | |
|---|---|---|
| Barium fluoride | parts by weight | 60 |
| Al(PO$_3$)$_3$ | do | 40 |
| F/P | do | 1.5 |
| $n_D$ | do | 1.5725 |
| $\nu$ | do | 69.6 |
| $\nu_{gF}$ | do | 0.542 |

In Table II, Examples 3, 4, and 5, conform strictly to System C, but Example 2, while based on both systems C and F, inasmuch as it includes calcium fluoride, the distinctive ingredient of System C, and lanthanum fluoride, the distinctive ingredient of System F, does not strictly conform to either. It is, however, related to both by including the three ingredients of each.

TABLE II
*Systems C and F*

| | Example | | | | | | | |
|---|---|---|---|---|---|---|---|---|
| | 2 | | 3 | | 4 | | 5 | |
| | W | M | W | M | W | M | W | M |
| CaF$_2$ | 1 | 2.5 | 4 | 9.8 | 22 | 43.3 | 15 | 31.9 |
| BaF$_2$ | 57 | 64.7 | 56 | 61.1 | 38 | 33.3 | 45 | 42.8 |
| LaF$_3$ | 4 | 4.1 | | | | | | |
| Al(PO$_3$)$_3$ | 38 | 28.7 | 40 | 29.1 | 40 | 23.4 | 40 | 25.3 |
| F/P | 1.7 | | 1.6 | | 2.2 | | 2.0 | |
| $n_D$ | 1.5805 | | 1.5654 | | 1.5482 | | | |
| $\nu$ | 68.7 | | 70.2 | | 72.2 | | | |
| $\nu_{gF}$ | 0.543 | | 0.538 | | 0.542 | | | |

Table III
*System G*

| | Example | | | |
|---|---|---|---|---|
| | 6 | | 7 | |
| | W | M | W | M |
| BaF$_2$ | 35 | 47.4 | 30 | 41.8 |
| ThF$_4$ | 45 | 34.6 | 50 | 39.6 |
| Al(PO$_3$)$_3$ | 20 | 18.0 | 20 | 18.6 |
| F/P | 4.3 | | 4.3 | |
| $n_D$ | 1.5895 | | 1.5919 | |
| $\nu$ | 70.3 | | 69.9 | |
| $\nu_{gF}$ | 0.543 | | 0.545 | |

In the following tables are given three examples containing fluorides of six or more metals, in every case, however, barium fluoride being preponderant in molar proportions.

TABLE IV

| | Example | | | | | |
|---|---|---|---|---|---|---|
| | 8 | | 9 | | 10 | |
| | W | M | W | M | W | M |
| MgF$_2$ | 0.5 | 1.8 | 0.3 | 1.0 | 0.4 | 1 |
| CaF$_2$ | 0.5 | 1.4 | 1.2 | 3.0 | 14.0 | 30 |
| ZnF$_2$ | 1.0 | 2.3 | 0.3 | 0.5 | 0.6 | 1 |
| SrF$_2$ | 0.5 | 0.9 | 0.3 | 0.5 | 0.7 | 1 |
| BaF$_2$ | 31.0 | 40.9 | 57.1 | 64.0 | 42.2 | 40 |
| LaF$_3$ | 0.5 | 0.7 | 3.0 | 3.0 | 2.4 | 2 |
| ThF$_4$ | 47.0 | 35.3 | | | | |
| Al(PO$_3$)$_3$ | 19.0 | 16.6 | 37.8 | 28.0 | 39.7 | 25 |
| F/P | 4.8 | | 1.7 | | 2.0 | |
| $n_D$ | | | | | 1.5653 | |
| $\nu$ | | | | | 70.0 | |

Figure 3:
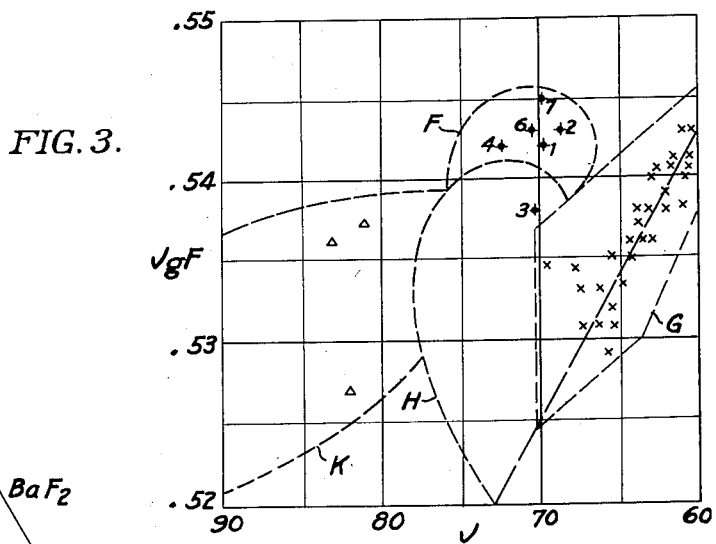
Figure 1:
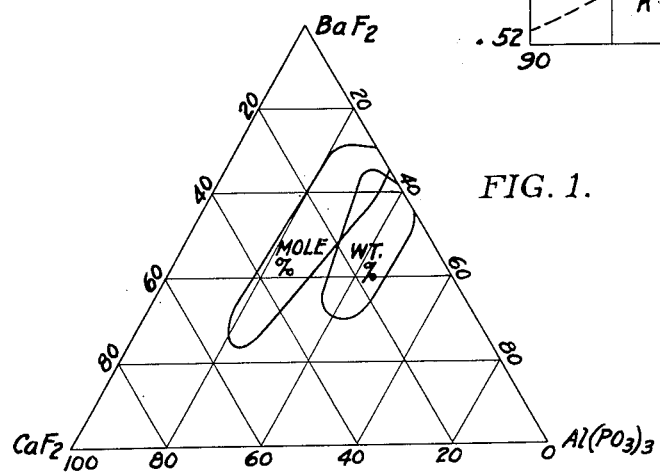

Reference will be made to the accompanying drawing, wherein Fig. 1 is a ternary diagram showing the approximate limits of vitrification of System C; and Figs. 2 and 3 are charts illustrative of certain optical properties of the new glasses in comparison with those of previously known glasses.

Fig. 1 shows for System C, in a ternary diagram, the limits of the region of glass formation as thus far ascertained experimentally. Having been determined empirically, they do not indicate a sharply defined boundary under all conditions, since glass formation is a function of experimental conditions such as the size of the melt, rate of cooling, shape of the final glass piece, and other operating factors. In this particular system, while the melting points of calcium and barium fluorides are 1392° and 1287° C., respectively, and that of the aluminum phosphate over 1400° C., the batch mixture whose composition is within the limit of glass formation region as indicated in Fig. 1 melts easily to a clear and fluid liquid at below 1000° C. This is true of the other systems given except System E, containing zinc fluoride.

Fig. 2 is a chart showing $n_D$ plotted against $\nu$. The area A includes these values for most commercially available glasses; B, for rare element borate glasses of the type disclosed in the Morey Reissue Patent No. 21,175; C, for fluoride glasses; D, for alkali metal-containing fluophosphate glasses; and E, the area within which are indicated these values for certain examples of my present invention, the example numbers being shown on the chart. It is to be noted that these new glasses have higher refractive indices for the same Abbé value than previously available glasses.

Fig. 3 is a chart showing $\nu_{gF}$ plotted against $\nu$, the positions being indicated for certain of the examples, these being located in area F. For comparison purposes, the positions of selected known commercial glasses are indicated by crosses in area G, those of certain fluoride glasses by small triangles in area K, while area H is the field within which lie the positions of alkali metal-containing glasses as disclosed in the copending application of Kuan-Han Sun (the present inventor) and Maurice L. Huggins, Serial No. 644,178, now Patent No. 2,481,700. It will be obvious to optical designers that these glasses have unusually desirable high blue partial dispersion ratios. The partial dispersion ratios for the red end of the spectrum have unusually low values of the same order as those of alkali metal-containing fluophosphate glasses. If pure materials are used, the glasses have high ultraviolet transmissions.

All of the glasses herein described are chemically durable. Not only are they highly moisture-resistant, but some also are almost unattacked by concentrated 48 per cent hydrofluoric acid. For example, the glass of Example 8 can be immersed in it for sixteen hours without visible effect on the fire-polished surface. On a mechanically polished surface the attack by the concentrated hydrofluoric acid is about 0.04–0.007 mg./cm.$^2$/hr. The attack seems to stop after one and one-half hours or less of immersion. I believe that this glass is the most resistant to hydrofluoric acid ever discovered.

In making these glasses, dry and impurity-free materials should be used. Platinum vessels may be safely used if there are no reducing agents, organic materials, or compounds containing boron present. These vessels should be fitted with a cover to minimize volatilization of the fluoride. The melting temperature is about 1050° C. or lower, depending on the individual composition. The molding temperatures are about 450–550° C. The melting time is in the order of a few minutes to one or two hours, depending on the temperature, composition, and size of the melt. These fluophospate melts are rather fluid at the melting temperature and may be stirred to insure uniformity. A clear glass is obtained by pouring the liquid into a previously heated mold and then cooling it slowly. A typical melt may be recorded as follows: 1 kg. of the batch of the Example No. 5 was uniformly mixed and fed to a 500-cc. platinum beaker placed inside a globar furnace, gradually raising the temperature from 750° to 950° C. in a period of one and one-half hours. The second and third feedings were made in the next one and one-half hours at a temperature of 950° C. A fluid liquid resulted which was heated for another one and one-half hours, at about 1000° C. The cover was removed and the liquid was stirred for about 10 minutes with a motor-driven platinum stirrer. During stirring, the temperature was dropped down to about 900° C. The liquid glass was then poured to a mold (5" x 5") previously heated to 480° C. and cooled down slowly to room temperatures. A clear piece of glass was obtained.

Having thus described my invention, what I claim is:

1. A fluophosphate optical glass having high resistance to hydrofluoric acid and consisting by weight of, aluminum metaphosphate, 19 parts, and the following fluorides: magnesium, 0.5 part; calcium, 0.5 part; zinc, 1 part; strontium, 0.5 part; barium, 31.0 parts; lanthanum, 0.5 part; and thorium, 47 parts.

2. A fluophosphate optical glass consisting of the fused heat reaction product of a batch containing at least sixteen mole per cent aluminum metaphosphate; and also compatible fluorides, of which barium fluoride is predominant and is present to at least twenty-six mole per cent, the total of barium fluoride and aluminum metaphosphate amounting to at least fifty-five mole per cent.

3. A fluophosphate optical glass consisting of the fused heat reaction product of a batch consisting of aluminum metaphosphate and compatible fluorides, the aluminum metaphosphate amounting to at least sixteen mole per cent of the batch, barium fluoride being present to at least twenty-six mole per cent, the total of barium fluoride and aluminum metaphosphate amounting to at least fifty-five mole per cent.

4. A fluophosphate optical glass consisting of the fused heat reaction product of an alkali-metal-free batch consisting of compatible materials and containing in mole proportions: barium fluoride, 23 to 71 per cent, and aluminum metaphosphate, 14 to 35 per cent.

5. A fluophosphate optical glass consisting of the fused heat reaction product of an alkali-metal-free batch consisting of compatible materials and containing in mole proportions: barium fluoride, 23 to 71 per cent; aluminum metaphosphate, 14 to 35 per cent; and including fluoride selected from the group consisting of the fluorides of magnesium, calcium, strontium, zinc, lanthanum, and thorium, 5 to 55 per cent.

6. A fluophosphate optical glass having high resistance to hydrofluoric acid and consisting of the fused heat-reaction product of a batch consisting of aluminum metaphosphate and compatible metal fluorides, the aluminum metaphosphate comprising from 19 to 40 per cent by weight of the batch, and the fluorides including by weight: magnesium fluoride, 0.3 to 0.4 per cent; calcium fluoride, 0.5 to 14.0 per cent; zinc fluoride, 0.3 to 1.0 per cent; strontium fluoride, 0.3 to 0.7 per cent; barium fluoride, 31 to 57.1 per cent; and lanthanum fluoride, 0.5 to 3.0 per cent.

KUAN-HAN SUN.

No references cited.